Patented Sept. 9, 1924.

1,507,709

UNITED STATES PATENT OFFICE.

SAMUEL PEACOCK, OF WHEELING, WEST VIRGINIA, ASSIGNOR TO WILLIS G. WALDO, OF WASHINGTON, DISTRICT OF COLUMBIA.

PROCESS OF PRODUCING ALUMINUM CHLORIDE AND SODIUM SILICATE.

No Drawing. Application filed October 17, 1921. Serial No. 508,263.

*To all whom it may concern:*

Be it known that I, SAMUEL PEACOCK, a citizen of the United States, residing at Wheeling, in the county of Ohio and State of West Virginia, have invented certain new and useful Improvements in Processes of Producing Aluminum Chloride and Sodium Silicates; and I do hereby declare the following to be a full, clear, and exact description of the invention, such as well enable others skilled in the art to which it appertains to make and use the same.

This invention relates to a process of producing aluminum chloride and sodium silicates from naturally occurring aluminum silicates, and has for its object to provide a process which will be less costly and more efficient than those heretofore proposed.

With these and other objects in view, the invention consists in the novel steps and combinations of steps constituting the process, all as will be more fully hereinafter disclosed and particularly pointed out in the claims.

In carrying out this invention, one may take any naturally occurring aluminum silicate that is high in aluminum but I prefer those which are substantially free from iron, such as kaolin or China clay, and after calcining the same, I next finely divide the material and mix it with sodium chloride in chemically reacting proportions. The mixture thus produced is heated to a temperature preferably of about 1200°, although temperatures from, say 1100° C. to 1300° C. may be employed when the following equation will occur:

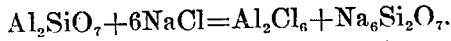

$$Al_2SiO_7 + 6NaCl = Al_2Cl_6 + Na_6Si_2O_7.$$

The aluminum chloride is produced at a relatively low temperature, and it is found in practice that it does not come off at atmospheric pressure with sufficient rapidity to make the process commercial. To avoid this objection I flow continuously through the furnace a stream of nitrogen thus displacing the aluminum chloride and causing the latter to continuously stream from the charge. The mixture of aluminum chloride and nitrogen is led into a suitable condenser, whereupon the aluminum chloride is recovered, and is found useful for a large number of purposes, among them that of making metallic aluminum. The molten sodium silicate may be also tapped out of the furnace and is utilized in various industries for example that of making metallic sodium.

The free nitrogen employed in this process is conveniently derived from liquid air machines used to supply nitrogen for various nitrogen fixation processes by boiling off the oxygen from the liquefied air.

What is claimed is:

1. The process of producing aluminum chloride, and sodium silicate, from naturally occuring aluminum silicates, which consists in calcining said silicates and mixing the same with sodium chloride; subjecting the mixture thus produced to a reacting temperature to produce the desired aluminum chloride and sodium silicate; passing free nitrogen over the charge to sweep out the volatile aluminum chloride and recovering said sodium silicate from the furnace, substantially as described.

2. The process of producing aluminum chloride and sodium silicate from naturally occurring aluminum silicates which consists in calcining and finely dividing said silicates and mixing the same with sodium chloride; subjecting the mixture thus produced to a reacting temperature below 1300° C. to produce the desired aluminum chloride and sodium silicate; continuously passing free nitrogen over the charge to sweep out the volatile aluminum chloride and recovering said sodium silicate from the furnace, substantially as described.

In testimony whereof I affix my signature.

SAMUEL PEACOCK.